W. M. Cord.
Horse Rake.

No. 56968

Patented Aug. 7, 1866.

Wm. M. Cord

Witness
Owen G. Warren
J. D. Sturtevant

UNITED STATES PATENT OFFICE.

WILLIAM McCORD, OF SING SING, NEW YORK.

IMPROVEMENT IN HORSE-RAKES.

Specification forming part of Letters Patent No. 56,968, dated August 7, 1866.

*To all whom it may concern:*

Be it known that I, WILLIAM McCORD, of Sing Sing, Westchester county, and State of New York, have invented a new and useful Combination of Devices to Render Useful the Horse-Rake; and I hereby declare that the following is a full and exact description.

To enable others to make and use my invention, I proceed to describe its construction and operation, reference being had to the drawings hereunto annexed and making part of this specification.

Figure 1:
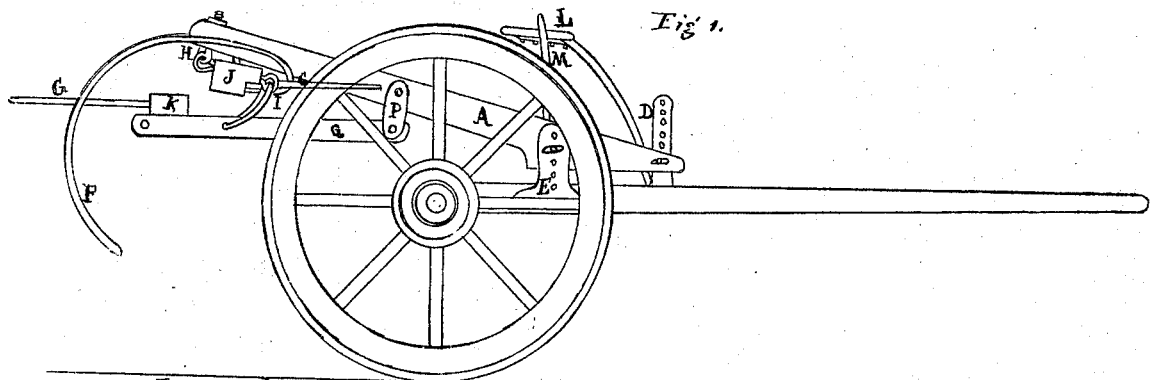
Figure 2:
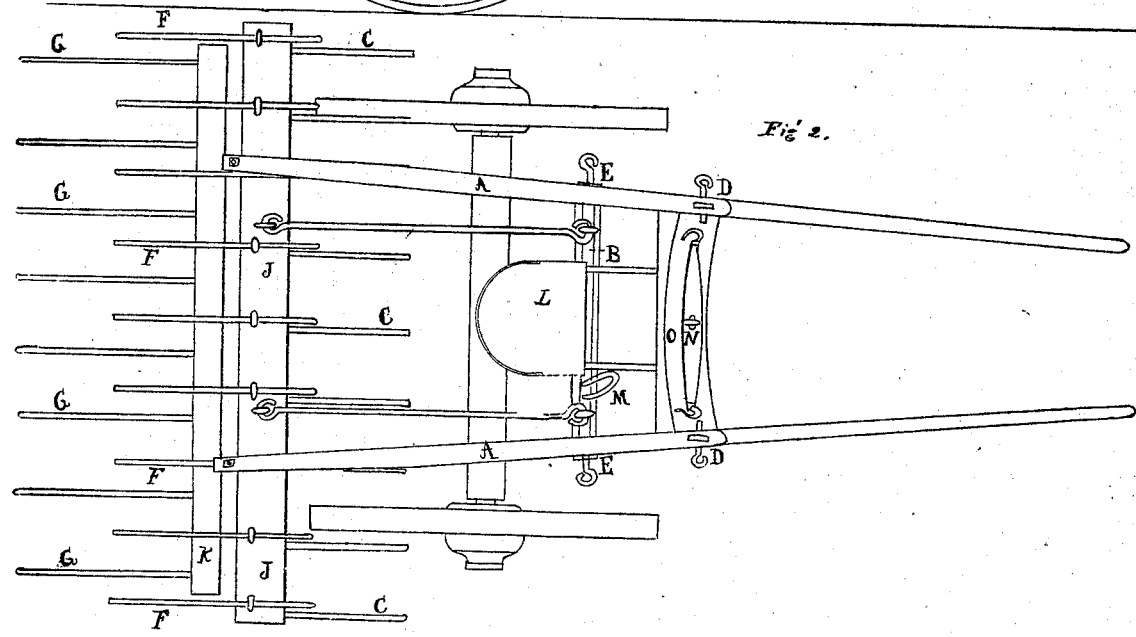

Figure 1, side elevation; Fig. 2, plan or bird's-eye view.

The same letters refer to the same things in all the designs.

A is the supporting-frame, on which is suspended the raking apparatus; B, the pivot-bar; C, the gathering-fingers, for holding down and packing the hay when it is discharged by the rake; D, uprights on the thill-iron plates, with holes for stationing the forward part of the supporting-frame high or low; E, the rear uprights, set on the outside of each thill, for stationing high or low the supporting-frame; F, the rake or teeth of it; G, disengaging-teeth; H, the rear hinge; I, the forward hinge, placed on the front of the cross-bar J, so as to balance the weight of the rake-teeth and disengaging-teeth; J, the cross-bar, over which, through staples, the rake-teeth are passed, forming a curve, to give them elasticity, and in the front side of which the gathering-fingers are set; K, the rear cross-bar, holding the disengaging-teeth G; L, the driver's seat; M, the lever by which he operates to discharge the hay from the rake; N, the whiffletree; O, the bar uniting the two thills; P, suspensory hinge supporting the forward end of the under frame, which holds the disengaging-teeth; Q, arms of the under frame.

The aim of this invention is to perfect the horse-rake by rendering it adaptable to the various exigencies of the farmer and to reduce the cost.

I economize by using small wheels, instead of those four and a half feet, generally used. I can use them of thirty inches, or still less, if for well-prepared ground. This I am enabled to do by making the supporting-frame A separate from the carriage and thills. This supporting-frame sits on four points, the front and rear uprights, D and E, the rear points being steadied by a pivot-bar, serving as part of the supporting-frame and holding the pivots E firm.

The wheels being low and the axle so near the ground, it would be difficult to make the rake directly on the axle or thills; therefore I make the supporting-frame (in some respects like the springs of a chaise) to sit high, and to vary, according to circumstances.

If a mule, a pony, or an ass be used, the frame must be set accordingly, and I put the whiffletree on the forward part of the supporting-frame, so that I can set it high or low. I can thus use the service of a tall horse or that of a small pony with the same horse-rake, and it will fit both equally well.

I have, of course, to keep the raking apparatus at its proper distance from the ground—that is, to just touch and not too heavily. When, therefore, I set the whiffletrees low for a pony, by stationing the forward part of the supporting-frame low on the uprights D, the rear would be raised; therefore I drop it down to the desired point on the rear uprights, E.

The weight of all the fingers F has a tendency to turn over the bar J. I therefore insert them in the front side of the bar, and under that front side hinge the under frame, Q. On this under frame, Q, is the cross-bar bearing the disengaging-fingers. The weight of the under frame is made to balance the rake-teeth, so that the driver has no difficult labor to operate the machine. A boy is equal to the task.

By all these improvements I effect a considerable economy in the original cost of the horse-rake, and when to be used it may be adapted to the draft of a small mule or a tall horse; and these are the essential points of my invention with regard to its adaptability.

The gathering-fingers C turn down on the front side of the windrow, while the disengaging-fingers turn on the other, and they aid to compress and hold the hay in place while the rake deposits it.

What I claim as my invention, and desire to secure by Letters Patent, is—

1. Sitting upon the four supports D and E an adjustable frame, A, upon which the whiffletree is placed, in the manner and for the purpose above described.

2. The gathering-fingers C, to aid in depositing the hay in a compact row in the manner described.

WM. McCORD.

Witnesses:
OWEN G. WARREN,
J. D. STURTEVANT.